United States Patent [19]
Nakashima et al.

[11] Patent Number: 4,807,076
[45] Date of Patent: Feb. 21, 1989

[54] THIN FILM MAGNETIC HEAD FOR USE IN VERTICAL MAGNETIC RECORDING

[75] Inventors: Keishi Nakashima, Nagaoka; Naohiro Ishibashi, Yoita, both of Japan

[73] Assignee: Alps Electric Co., Ltd., Japan

[21] Appl. No.: 24,352

[22] Filed: Mar. 10, 1987

[30] Foreign Application Priority Data

Jul. 22, 1986 [JP] Japan .............................. 61-172542

[51] Int. Cl.⁴ ............................................ G11B 5/147
[52] U.S. Cl. .................................................. 360/126
[58] Field of Search ................................ 360/110, 126

[56] References Cited
U.S. PATENT DOCUMENTS 4,546,398 10/1985 Toda .................................... 360/126
4,575,777 3/1986 Hosokawa ...................... 360/110 X Primary Examiner—A. J. Heinz
Attorney, Agent, or Firm—Guy W. Shoup; Paul J. Winters

[57] ABSTRACT

A thin film magnetic head for use in the vertical magnetic recording having a main magnetic pole for carrying out recording and reproduction on and from a recording medium, and an auxiliary magnetic pole for cooperating with the main magnetic pole to form a closed magnetic circuit wherein the dimension of the auxiliary magnetic pole is made larger than that of the main magnetic pole at its end facing the recording medium and in their tracking direction to enhance reproduction efficiency.

3 Claims, 3 Drawing Sheets

THIN FILM MAGNETIC HEAD FOR USE IN VERTICAL MAGNETIC RECORDING

BACKGROUND OF THE INVENTION (a) Field of the Invention

The present invention relates to a thin film magnetic head for use in vertical magnetic recording.

(b) Prior Art

The vertical magnetic recording system which enables high density recording to be achieved has the problem that its reproduction efficiency is low. In the case of the thin film magnetic head which has a main magnetic pole for carrying out recording and reproduction and an auxiliary magnetic pole for cooperating with the main magnetic pole to form a closed magnetic circuit, various kinds of proposals have been made to enhance the reproduction efficiency. One of these proposals pays its attention to the thickness (or film thickness) of the auxiliary magnetic pole. When this thickness is made larger than 10 μm, for example, the reproduction efficiency can be enhanced. However, it is difficult to form such an auxiliary magnetic pole as has a film thickness larger than 10 μm. In fact, the auxiliary magnetic pole whose film is thick like this will not be available unless film forming speed is made faster and etching manner is improved.

SUMMARY OF THE INVENTION

The object of the present invention is therefore to provide a thin film magnetic head for use in the vertical magnetic recording which is originated from a viewpoint different from the prior art viewpoint of increasing the thickness of the auxiliary magnetic pole and which can enhance the reproduction efficiency.

The present invention is based on the finding that when the width of an auxiliary magnetic pole is increased in its tracking direction, the reproduction efficiency can be enhanced as if its thickness were increased. More specifically, the present invention is intended to provide a thin film magnetic head for use in the vertical magnetic recording having main and auxiliary magnetic poles and characterized in that the dimension of the auxiliary magnetic pole is made larger in its tracking direction and at its end facing the recording medium than that of the main magnetic pole. It is preferable to set the dimension of the auxiliary magnetic pole larger than two times the dimension of the main magnetic pole in the tracking direction thereof.

DETAILED DESCRIPTION OF THE PREFERRED EMBODIMENT

Figure 1:
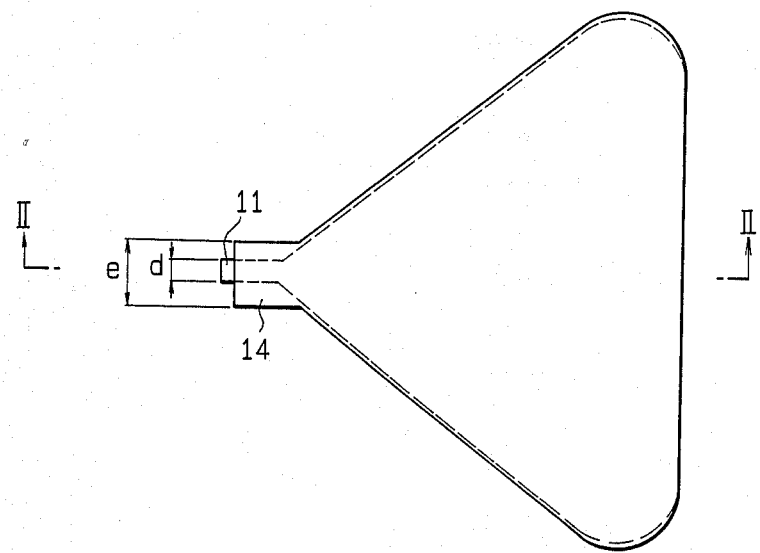
FIG. 1 is a front view showing the relation of main and auxiliary magnetic poles in the case of a thin film magnetic head for use in the vertical magnetic recording according to the present invention.
Figure 2:
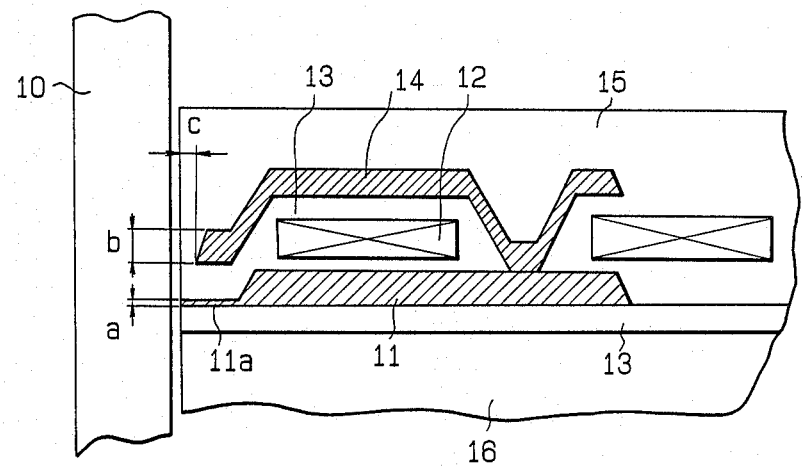
FIG. 2 is a sectional view taken along a line II—II in FIG. 1.

FIGS. 1 and 2 show an example of the thin film magnetic head according to the present invention. A main magnetic pole 11 has a thin film portion 11a at its foremost end facing a vertical magnetic recording medium 10, and an auxiliary magnetic pole 14 is formed on the main magnetic pole 11 with a coil 12 and an insulating layer 13 interposed between them. The coil 12 has its center behind the thin film portion 11a and the auxiliary magnetic pole 14 cooperates with the main magnetic pole 11 to form a closed magnetic circuit. Numeral 15 represents a protection film, and these above-mentioned layers are formed on a substrate 16 according to the thin film forming technique.

Figure 3A:
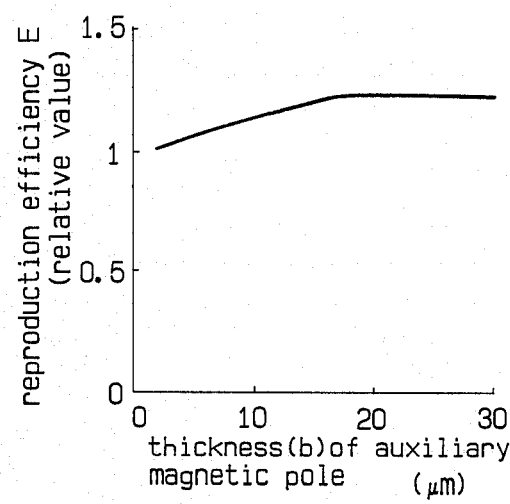
FIGS. 3(a), 3(b) and 3(c) are graphs showing relations between dimensions of the main and auxiliary magnetic poles and the reproduction efficiency.

The reason why the main magnetic pole 11 is made to have the thin film portion 11a at its foremost end facing the vertical magnetic recording medium 10 resides in achieving high reproduction and resolution. More specifically, the thickness (a) of this foremost end thin film portion 11a is made smaller than 0.30 μm. When the thickness (b) of the auxiliary magnetic pole 14 is made larger than 10 μm, as described above, reproduction efficiency can be enhanced. FIG. 3(a) is a graph showing the relationship between this thickness (b) and the reproduction efficiency E (relative value obtained assuming that the efficiency is 1 when the thickness is the smallest), and when the thickness (b) is made larger than 10 μm, preferably 20 μm, the reproduction efficiency can be enhanced. However, it is practically impossible to increase the thickness (b) of the auxiliary magnetic pole like this.

Figure 3B:
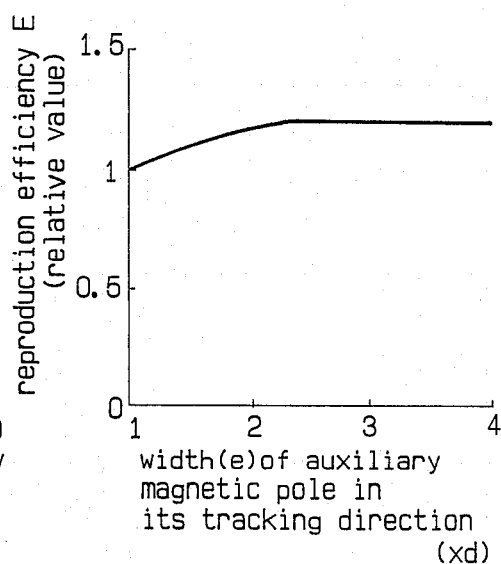

In the case of the present invention, therefore, the width (e) of the auxiliary magnetic pole 14 is made larger than the width (d) of the main magnetic pole 11 at its end facing the vertical magnetic recording medium 10 and in their tracking direction, as apparent from FIG. 1. FIG. 3(b) is a graph intended to plot magnifications of the width (e) relative to the width (d) and reproduction efficiencies E (relative values obtained assuming that the efficiency is 1 when e=d), and it can be understood from FIG. 3(b) that the reproduction efficiency increases linearly until the width (e) becomes substantially two times the width (d) and that the efficiency becomes substantially certain when (e) exceeds two times of (d). It is therefore better to set the width (e) larger than two times the width (d).

It is much easier to increase the width (e) of the auxiliary magnetic pole 14 like this than the film thickness thereof, and no structural difficulty exists in doing so. In short, the shape of the auxiliary magnetic pole 14 may be determined according to an etching pattern and this can be successfully realized by the prevailing thin film forming technique. Even when the film thickness of the auxiliary magnetic pole 14 is not increased, therefore, the reproduction efficiency can be enhanced as if this film thickness were increased. However, the present invention is not intended to prevent the film thickness of the auxiliary magnetic pole 14 from being increased as wide as possible.

When the width (e) of the auxiliary magnetic pole 14 is increased as described above, there is a fear that the distribution of recording magnetic field is badly influenced, but this bad influence can be eliminated when that end of the auxiliary magnetic pole 14 which faces the vertical magnetic recording medium 10 is slightly retreated from that end of the main magnetic pole 11 which also faces the vertical magnetic recording medium 10.

Figure 3C:
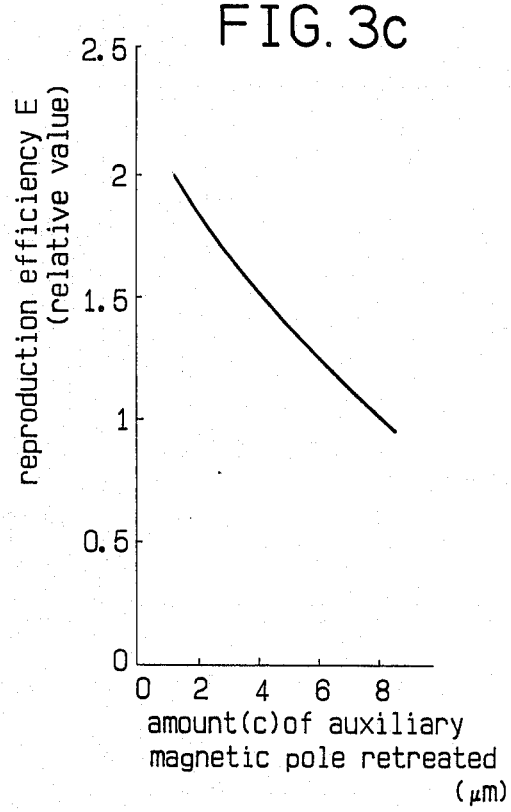
Figure 4A:
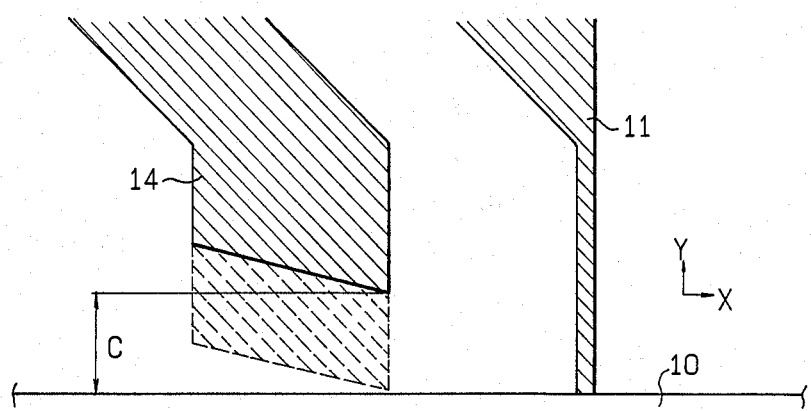
FIGS. 4(a), 4(b) and 4(c) are a sectional view showing the position of the auxiliary magnetic pole relative to the main magnetic pole, and graphs showing the state of magnetic field distributed when the auxiliary magnetic pole is positioned like this relative to the main magnetic pole.
Figure 4B:
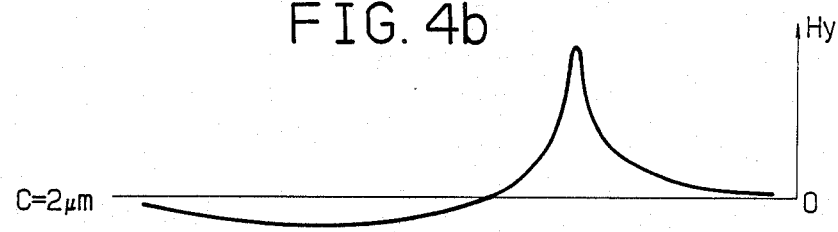
Figure 4C:
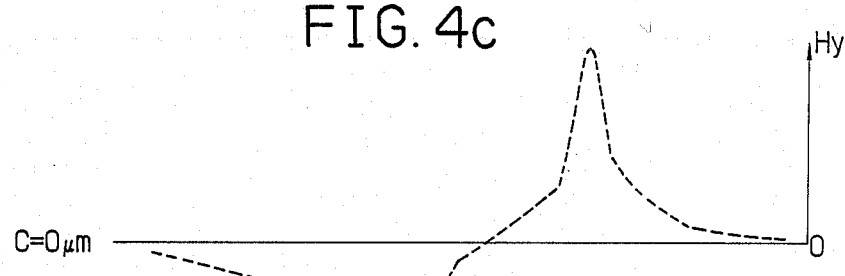

This will be explained referring to FIG. 4, which includes an enlarged view showing the main magnetic pole and its neighbourhood of the magnetic head according to the present invention and graphs showing distributions of magnetic field in vertical components (Hy). When the amount of the auxiliary magnetic pole 14 retreated from the main magnetic pole 11 is denoted by (c) and this (c) is zero, a peak of magnetic field which is reversed to that of magnetic field generated from the main magnetic pole 11 appears at the neighbourhood of the auxiliary magnetic pole 14, as shown in FIG. 4(b), and this peak is large enough not to be neglected in relation to that of the magnetic field generated from the main magnetic pole 11. When C=0, therefore, there is a fear that the distribution of recorded magnetic field is badly influenced. When (c) is in a range of 1-5 $\mu$m, however, the peak of this reversed magnetic field is not remarkable and it provides no bad influence accordingly. FIG. 4(c) shows the distribution of magnetic field when c=2 $\mu$m. FIG. 3(c) is a graph intended to plot these (c) and recording and reproducing efficiencies E (relative values obtained assuming that the efficiency is 1 when c is 8 $\mu$m), and it can be understood from FIG. 3(c) that the bad influence relative to the distribution of recorded magnetic field can be eliminated without worsening the reproduction efficiency when c is in the range of 1-5 $\mu$m.

The present invention allows the main and auxiliary magnetic poles 11 and 14 to be made of any of magnetic materials, and parmalloy, alloys of Fe-Al-Si system and amorphous of Co system may be employed, for example.

According to the thin film magnetic head for the vertical magnetic recording of the present invention as described above, the width of the auxiliary magnetic pole is made larger than that of the main magnetic pole at its end facing the recording medium and in their tracking direction, so that the reproduction efficiency can be enhanced as if the thickness of the auxiliary magnetic pole were increased. It is much easier to increase the width of the auxiliary magnetic pole than the thickness thereof, and this can be successfully processed by the prevailing thin film forming technique. Therefore, the present invention enables the reproduction efficiency to be enhanced without increasing the structural difficulty and making the cost high.

We claim:

1. A thin film magnetic head for use in vertical magnetic recording on a recording medium moving in a horizontal, tracking direction, comprising:

a main magnetic pole for recording and reproducing on and from the recording medium which is oriented in a vertical direction to the recording medium, has an end portion of a first thickness dimension in the tracking direction, and is disposed in a vertical position in close proximity of to the recording medium; and an auxiliary magnetic pole for cooperating with said main magnetic pole to form a closed magnetic circuit which is oriented in the vertical direction, has an end portion of a second thickness dimension in the tracking direction, and the end portion is disposed facing the recording medium at a vertical position retracted from the recording medium by a predetermined distance from the position of the end portion of said main magnetic pole;

wherein the predetermined distance said end portion of said auxiliary magnetic pole is retracted is in the range of 1-5 $\mu$m.

2. A thin film magnetic head for use in vertical magnetic recording on a recording medium moving in a horizontal, tracking direction, comprising:

a main magnetic pole for recording and reproducing on and from the recording medium which is oriented in a vertical direction to the recording medium, has an end portion of a first thickness dimension in the tracking direction, and is disposed in a vertical position in close proximity of to the recording medium; and an auxiliary magnetic pole for cooperating with said main magnetic pole to form a closed magnetic circuit which is oriented in the vertical direction, has an end portion of a second thickness dimension in the tracking direction, and the end portion is disposed facing the recording medium by a predetermined distance from the position of the end portion of said main magnetic pole;

wherein the first thickness dimension of the auxiliary magnetic pole is larger than two times the second thickness dimension of the main magnetic pole in their tracking direction.

3. A thin magnetic head in accordance with claim 2, wherein the predetermined distance said end portion of said auxiliary magnetic pole is retracted is in the range of 1-5 $\mu$m.

* * * * *